United States Patent [19]

Russell

[11] Patent Number: 4,657,595

[45] Date of Patent: Apr. 14, 1987

[54] QUICK SETTING ANIONIC BITUMINOUS EMULSIONS

[75] Inventor: Alan Russell, Corsicana, Tex.

[73] Assignee: The Procter & Gamble Company, Cincinnati, Ohio

[21] Appl. No.: 776,278

[22] Filed: Sep. 16, 1985

[51] Int. Cl.$^4$ .............................................. C08L 95/00
[52] U.S. Cl. ................. 106/277; 106/273 N; 252/311.5; 524/59; 525/54.4
[58] Field of Search ............ 106/277, 273 N; 252/311.5, 558; 524/59; 525/54.4

[56] References Cited

U.S. PATENT DOCUMENTS

| | | | |
|---|---|---|---|
| 3,097,174 | 7/1963 | Mertens | 252/311.5 |
| 3,123,569 | 3/1964 | Borgfeldt | 252/311.5 |
| 3,126,350 | 3/1964 | Borgfeldt | 252/311.5 |
| 3,740,344 | 6/1973 | Fern | 252/311.5 |
| 4,193,816 | 3/1980 | Fern et al. | 106/277 |
| 4,450,011 | 5/1984 | Schilling et al. | 106/269 |

FOREIGN PATENT DOCUMENTS 00156817 9/1982 German Democratic Rep. .
437789 12/1974 U.S.S.R. .

*Primary Examiner*—Amelia B. Yarbrough
*Attorney, Agent, or Firm*—Ronald L. Hemingway; Richard C. Witte

[57] ABSTRACT

Quick setting anionic bituminous emulsions in which the emulsifier is an alkylbenzenesulfonic acid which has been neutralized with specified alkyl or hydroxyalkyl amines.

11 Claims, No Drawings

QUICK SETTING ANIONIC BITUMINOUS EMULSIONS

FIELD OF THE INVENTION

The invention pertains to anionic oil-in-water emulsions of bitumen which are useful as pavement sealers, roofing dressings, wood dressings, and the like.

BACKGROUND OF THE INVENTION

The ever-increasing traffic and heavy wear to which pavements are exposed, aggravates the need for a rapid and efficient means for sealing the pavement to provide a long wearing surface.

Bituminous emulsions utilizing anionic emulsifiers have been widely used to seal pavements, but have been deficient in requiring a relatively long setting-time before they hardened to a useful surface. These anionic emulsions set by evaporation. Therefore, the time for setting will greatly vary depending on the temperature and humidity, as well as other environmental factors. In addition, the freshly applied emulsions are particularly susceptible to rain. If they have not hardened to a cohesive surface, a rainstorm will rapidly wash away or seriously damage the surface seal. Because of this deficiency of anionic bituminous emulsions, the prior air has sought means to shorten the setting time of such emulsions.

It is also desirable to incorporate synthetic latex polymers into bituminous emulsions in order to improve the durability of the coating which is produced and to increase the resistance of the coating to the effects of temperature.

U.S. Pat. No. 4,193,816 Ferm, issued Mar. 18, 1980, discloses quick-setting anionic bituminous emulsions in which the quick setting property is obtained by adding lime to the emulsion just prior to application to the pavement. The emulsifiers disclosed in said patent include salts of hydrocarbon sulfonic acids wherein the salt-forming cation can be an alkali metal, ammonium or substituted ammonium ion. The emulsions have a pH above 7 and can contain a synthetic rubber latex.

It is an object of the present invention to provide quick setting anionic bituminous emulsions which do not require the incorporation of an additive just prior to use. It is a further objective of the invention to provide quick setting bituminous emulsions which contain a synthetic rubber latex.

SUMMARY OF THE INVENTION

The present invention is directed to quick-setting bituminous emulsion compositions wherein amine and alkanolamine salts of alkylbenzenesulfonic acids are used as the emulsifiers. Preferred compositions are those wherein the alkanolamine salts are used as the emulsifier, the pH is from about 2.5 to about 6.9 and wherein the compositions contain a chloroprene-methacrylic acid synthetic rubber latex.

DETAILED DESCRIPTION OF THE INVENTION

In accordance with the present invention it has been found that bituminous emulsion compositions which utilize amine and alkanolamine salts of alkylbenzene sulfonates as the emulsifiers exhibit quick setting properties, and therefore are especially suitable for use as pavement dressings. It has been found that these emulsions "break" quickly when applied to the pavement surface.

The term "quick setting" as used herein means that the aqueous emulsion will coagulate more than 2% when tested in accordance with the ASTM D-244, cement mixing test.

Breaking of the emulsion results in migration of the water to the surface of the coating (where it forms into droplets and evaporates) and in setting of the bituminous coating. This is in contrast to typical anionic slow setting bituminous emulsion compositions which depend upon homogeneous evaporation for removal of water and setting of the coating. Homogeneous evaporation inherently results in slow setting of the coating, especially so under conditions of low temperature and high humidity.

The bituminous emulsion compositions of the present invention comprise:

(a) from about 50% to about 70% by weight of a non-coal tar bitumen;

(b) from about 0.1% to about 3% by weight of an emulsifier which is the amine salt of an alkylbenzene sulfonic acid in which the alkyl contains from about 8 to about 16 carbon atoms and wherein the salt-forming amine is selected from amines having the formula:

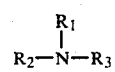

wherein $R_1$ is an aminoalkyl or monohydroxyalkyl radical containing from 1 to about 6 carbon atoms and $R_2$ and $R_3$ are each selected from the group consisting of hydrogen, alkyl, aminoalkyl and monohydroxyalkyl radicals containing from 1 to about 6 carbon atoms; and (c) from about 30% to about 50% water.

All percentages and proportions herein are "by weight" unless specified otherwise.

The bitumens used in the compositions herein can be any of the bitumens commonly used in pavement or roofing emulsion dressings. Examples are asphalt, asphalt cut-backs and pitch. Coal tar bitumens are not suitable for use in the invention. The invention will be illustrated herein, using asphalt.

The emulsifiers used in the compositions of the invention are amine salts of alkylbenezenesulfonic acids,

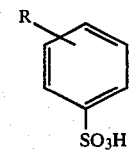

where R is an alkyl group (linear or branched) containing from about 8 to about 16 (preferably from about 10 to about 14) carbon atoms. The neutralizing amine from which the salt is formed is a primary, secondary or tertiary amine of the formula:

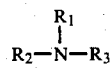

wherein $R_1$ is an amino alkyl or monohydroxyalkyl radical containing from 1 to about 6 carbon atoms and $R_2$ and $R_3$ are each selected from the group consisting of hydrogen, alkyl, aminoalkyl and monohydroxyalkyl radicals containing from 1 to about 6 carbon atoms. Examples of the said amines are ethylenediamine, diethylenetriamine, triethylenetetraamine aminoethylpiperazine, aminoethylethanolamine, ethanolamine, methylethanolamine, diethanolamine, triethanolamine, trimethylolamine, dimethylethanolamine. The amine salts herein are 1:1 molar ratio salts of alkylbenzene sulfonic acid and amine, i.e., even if the amine contains more than one reactive amino group, the salt is one wherein only one amino group has been reacted with the alkylbenzene sulfonic acid. This is achieved by using at least one mole of amine per mole of acid when preparing the salt.

The emulsions can be prepared by known techniques for preparing bituminous emulsions, e.g., using a colloid mill.

The emulsions herein should be formulated to have a pH of from about 2.5 to about 10. The pH can be adjusted to any desired level within this range with acid (e.g., HCl) or base (e.g., NaOH).

A particularly desirable optional component of the emulsion compositions herein is a synthetic latex rubber polymer. The latex polymer makes the surface coating produced by the composition less susceptible to temperature extremes, and increases the toughness and tenacity of the coating and may provide resistance to the deterioration caused by oxidation and ultraviolet radiation.

The latex polymers are aqueous suspensions of synthetic rubber. Examples of latex polymers are the following:

1. The family of SBR latices which are the emulsion copolymers of styrene and butadiene monomers. Typically, the styrene content varies from 20% to 30%, and the butadiene content varies from 70% to 80% and such latices are manufactured in a resin acid soap. There are specific products available from several manufactures (for example, Polysar ® Latex from Polysar Incorporated which contains approximately 30% water, 5% resin acid soap, and 65% polymer which is the copolymer of styrene and butadiene in the ratio of 30 to 70; and Latex Ultrapave-70 ® from Textile Rubber & Chemical Co., which contains approximately 30% water, 5% resin acid soap, and 65% polymer which is the copolymer of styrene and butadiene). These have been widely marketed as additives for paving applications.

2. The Neoprene homopolymer latices which are homopolymers of chloroprene, usually manufactured in resin acid soaps. Neoprene latices are particularly useful in paving applications because they are vulcanized by various mechanisms including sulfur and metallic oxides and resist oxidation and solvent action. A typical Neoprene homopolymer contains 40% to 50% water, 5% to 10% resin soap and 40% to 55% polymer. An example is Neoprene ® Latex 671A from E. I. duPont de Nemours & Co., Inc.

3. Neoprene latex copolymer which is a copolymer of chloroprene and methacrylic acid. A typical product of this type is Neoprene ® Latex 115 from duPont Company, which contains 50% to 55% water, approximately 1% of a nonionic dispersant, and 44% to 49% polymer which is approximately 95% chloroprene and 5% methacrylic acid. This type of latex has available carboxylic acid groups in the polymer structure. The presence of carboxylic acid structures allows for vulcanization in the presence of bivalent or trivalent metallic ions ($Ca^{++}$ or $Fe^{+++}$ as examples) at low temperatures. However, the presence of these same carboxylic acid structures precludes the use of this latex in a caustic medium.

When latex polymers are used in bituminous emulsion compositions, they are generally used in concentrations (based on weight of latex solids) of less than 2.5% for pavement sealing applications, and more than 2.5% for elastic coating applications. Therefore, depending upon application, the latex content of the emulsions herein may be as little as 0.25% to as high as 70% latex solids by weight of the bituminous emulsion.

When the latex polymer used is the chloroprene-methacrylic acid copolymer previously described, it is preferable that the emulsion be formulated at an acid pH, preferably within the range from 2.5 to 6.9, most preferably from about 4.5 to about 5.5. This assures that the acid groups in the copolymer remain in the acid form.

When formulating in the acid pH range, it is preferable that the salt-forming amine for the emulsifier be an alkanolamine, i.e., at least one of the $R_1$, $R_2$ and $R_3$ radicals in the salt-forming amine is a hydroxyalkyl group, e.g., monoethanolamine, methyldiethanolamine or triethanolamine. The alkanolamine salts are superior to other amine salts (and metallic salts) of alkylbenzene sulfonates for formulating bituminous emulsion of acid pH.

Typically, the emulsions herein will have particulate materials (aggregates) added to them to form slurries, e.g., slurry seals for pavements. The aggregates provide durability, hardness, etc., to the coating formed with the emulsion composition.

Depending upon the ultimate use of the slurry, a variety of aggregates may be employed. Suitable materials include rubber buffings, cut fibers, such as those of bagasse, hemp, organic polymeric fibers, made from polypropylene, polyesters, polyamides, and mineral aggregates, such as gravel, crushed lava, crushed granite, crushed limestone, sand, clay, etc.

The particle size of the aggregate will vary depending upon the particular use. The particles may range from about 1 micron or less to about 1 inch or greater. Mixtures containing a large variation of particle sizes are suitable in particular uses. However, when mineral aggregates are used in the slurry seals, the particle size will be that within the ranges normally specified for slurry seals. See the *Asphalt Handbook*, Revised Edition, the Asphalt Institute, College Park, Md., September 1960, pages 60 and 216-218. Normally, the aggregates for slurry seals are of a particle size in the range of from about 4 to about 200 mesh, U.S. Standard sieve. Usually, the aggregate will be siliceous or calcareous, illustrated by fine sand, crusher dust, crushed granite, etc.

In slurries, the bitumen emulsion will be present in from about 3 to 150 parts, more usually from about 5 to 100 parts, and preferably from about 10 to 30 parts based on 100 parts of aggregate. In slurry seals for pavements, the emulsion will normally be present in from about 15 to 25 parts per 100 parts of aggregate. The emulsion will normally have from about 50 to 70 weight percent, more usually from about 55 to 65 weight percent of bitumen. Any of the paving-type asphalts available in commerce will lend itself as a suitable bitumen. In slurry seals, preferred paving bitumens usually have a penetration at 77° F. of from about 40 to 110. The emulsifier will be present in the emulsion at from about 0.1% to 3%, and preferably from about 0.25% to about 0.75% by weight of the emulsion. Other additives may also be present, their amounts varying from about 0.05 to 3 weight percent of the emulsions. The remainder of the emulsion will be water, varying usually from about 25 to 49.9 weight percent.

Included among the other additives which may be present are bentonite, alkali metal salts of phenol sulfonate, and, as discussed supra, latex polymers.

In preparing slurry seals, conventional slurry seal equipment may be used, as exemplified in U.S. Pat. No. Re. 26,204, Young, granted May 16, 1967. Means are provided for mixing the bitumen emulsion and aggregate so as to provide a fairly homogeneous mixture. The mixing normally requires from about 0.5 to 5 minutes, more usually from about 1 to 3 minutes.

The bituminous emulsions of the inventions can optionally contain from about 0.0025% to about 1% of a surface active cationic quaternary ammonium salt containing at least one 8 to 24 carbon atom alkyl group in its structure. These cationic salts promote adhesion to the surface to which the emulsion is applied. Examples of suitable cationic surfactants are quaternary ammonium salts corresponding to the formulas:

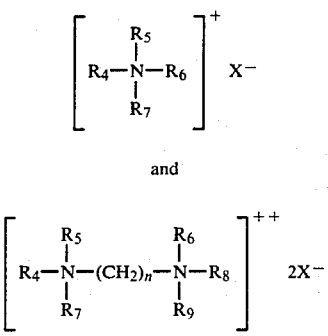

and wherein $R_4$ is an alkyl group containing from 8 to about 24 (preferably about 12 to about 22 carbon atoms); $R_5$, $R_6$, $R_7$, $R_8$ and $R_9$ are selected from the group consisting of alkyl and monohydroxyalkyl radicals containing from 1 to about 3 carbon atoms, n is from 2 to 4 (preferably 3) and $X^-$ is selected from the group consisting of monovalent radicals consisting of halide, methylsulfate, nitrate and $C_1$ to $C_5$ carboxylic acid radicals. Specific examples of these quaternary ammonium compounds are stearyltrimethyl ammonium chloride and N-stearyl-dimethyl-N'-trimethylethylenediamine dichloride.

If the emulsion is to be used in a slurry seal composition containing aggregates, it is preferred that these cationic materials, if used, not be formulated into the composition, but rather be dispersed in water and sprayed onto the pavement surface before application of the slurry seal. When spraying the cationic material onto the pavement an application rate of from about 1 to about 10 g per sq. m of pavement is used.

The invention will be illustrated by the following Examples.

EXAMPLE I

An asphalt emulsifier composition is prepared mixing 50 parts dodecyl benzene sulfonic acid, 10 parts ethylene diamine, 20 parts water, and 20 parts diethylene glycol. The mixture is stirred in a closed reactor which then cooled to remove the exotherm. The mixture is an easily pourable liquid which can conveniently be used to prepare bituminous emulsions.

EXAMPLE II

An asphalt emulsifier composition similar to that of Example II is prepared by substituting 15 parts diethylenetriamine for the 10 parts ethylenediamine used in Example I, and 15 parts water for the 20 parts water used in Example I.

EXAMPLE III

An asphalt emulsifier composition similar to that of Example I is prepared by substituting 20 parts of a commercially available ethyleneamine by-product which is 40% aminoethylpiperazine and 60% nonlinear and linear tetramine which consists at least partially of triethylenetriamine; and substantial amounts of "tris" tetramine for the 10 parts ethylenediamine used in Example I and substituting 10 parts water for the 20 parts water used in Example I.

EXAMPLE IV

An asphalt emulsifier composition similar to that of Example I is prepared by substituting 10 parts monoethanolamine for the 10 parts ethylenediamine used in Example I.

EXAMPLE V

An asphalt emulsion is prepared using conventional technology consisting of 62 parts Gulf States AC-20 asphalt and one part of the emulsifier described in Example IV and 37 parts of water. The emulsifier is dissolved into the water and the solution is adjusted to a pH of approximately 5.5 with approximately 0.01 part of hydrochloric acid.

EXAMPLE VI

A conventional slurry seal is prepared in a conventional slurry seal machine consisting of 100 parts of type II Joplin Chat aggregate, 12 parts of water, and 16 parts of the emulsion of Example V. Optional ingredients which can be added to this slurry are 0–1 part of a fine mineral filler and 0.05 part of Neoprene ® Latex 115.

EXAMPLE VII

A driveway sealer is prepared by mixing approximately 32 parts of the emulsion in Example V with approximately one part of duPont Neoprene ® Latex 115, and blending this mixture with approximately 33 parts of graded #16 sieve sand, approximately 33 parts of clay slurry containing approximately 30% M&D Ball Clay, and approximately one part water that may contain up to 50% tallowtrimethylammonium chloride quaternary. In practice, this product is manufactured in a ribbon blender with the ingredients added in the stated order. The mixture becomes a mechanical suspension of coated aggregate particles upon continued mixing.

In summary, this invention comprises the manufacture and use in asphalt emulsions of amine salts of alkylbenzene sulfonates where the neutralizing amine is chosen from the family of ethyleneamines or alkanolamines.

When the family of alkanolamines is chosen, the result is an asphalt emulsifier which is quick setting (failing the cement mixing test) anionic (producing negatively charged asphalt particles) and acidic (having a nominal pH of 5.5).

Both families of asphalt emulsifiers described herein are compatible with latices supplied with anionic or nonionic soaps as the dispersion agent. But only the ethanolamine family of emulsifiers is compatible with latices containing carboxylic groups (i.e., chloroprene/acrylic acid copolymers).

What is claimed is:

1. A bituminous emulsion comprising:
   (a) from about 50% to about 70% by weight of non-coal tar bitumen;
   (b) from about 0.1% to about 3% by weight of an emulsifier which is the amine salt of an alkylbenzene sulfonic acid in which the alkyl contains from about 8 to about 16 carbon atoms and wherein the salt-forming amine is selected from amines having the formula:

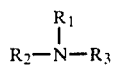

wherein $R_1$ is selected from the group consisting of aminoalkyl and monohydroxyalkyl radicals containing from 1 to about 6 carbon atoms and $R_2$ and $R_3$ are each selected from the group consisting of hydrogen, alkyl, aminoalkyl and monohydroxyalkyl radicals containing from 1 to about 6 carbon atoms and wherein the molar ratio of alkylbenzene sulfonic acid to amine in the amine salt is 1:1; and
   (c) from about 30% to about 50% water,
   the said composition having a pH of from about 2.5 to about 10.

2. The composition of claim 1 which additionally comprises from about 0.25% to about 70% of synthetic latex solids.

3. The composition of claim 2 wherein the synthetic latex is a copolymer of chloroprene and methacrylic acid, wherein at least one of $R_1$, $R_2$ and $R_3$ in the neutralizing amine is a hydroxyalkyl radical and wherein said emulsion has a pH of from about 2.5 to about 6.9.

4. The composition of claim 1 in the form of an aggregate-containing slurry, the said slurry comprising from about 3 to about 150 parts of the emulsion of claim 1 per 100 parts of aggregate, the said particulate aggregate having a particle size of from about 1 micron to about 1 inch.

5. The composition of claim 4 wherein the particulate aggregate is a siliceous or calcareous mineral and has a particle size of from about 4 mesh to about 200 mesh.

6. The composition of claim 2 in the form of an aggregate-containing slurry, the said slurry comprising from about 3 to about 150 parts of the emulsion of claim 2 per 100 parts of particulate aggregate, the said particulate aggregate having a particle size of from about 1 micron to about 1 inch.

7. The composition of claim 6 wherein the particulate aggregate is a siliceous or calcareous mineral and has a particle size of from about 4 mesh to about 200 mesh.

8. The composition of claim 3 in the form of an aggregate-containing slurry, the said slurry comprising from about 3 to about 150 parts of the emulsion of claim 3 per 100 parts of aggregate, the said particulate aggregate having a particle size of from about 1 micron to about 1 inch.

9. The composition of claim 8 wherein the particulate aggregate is a siliceous or calcareous mineral and has a particle size of from about 4 mesh to about 200 mesh.

10. The composition of any of claims 1, 2 or 3 which additionally contains from about 0.0025% to about 1% of an adhesion promoting agent which is a surface active quaternary ammonium salt having at least one 8 to 24 carbon atom alkyl group in its structure.

11. A method of sealing a pavement surface comprising the steps of:
    (1) applying to said pavement surface a coating of quaternary ammonium surface active agent having at least one 8 to 24 carbon atom alkyl group in its structure, the said coating being applied at a rate so as to provide from about 1 to about 10 grams of quaternary ammonium salt per square meter of pavement surface; and
    (2) applying over the coating of Step (1) a coating of an aggregate-containing bituminous emulsion slurry comprising:
       (A) a bituminous emulsion comprising:
          (a) from about 50% to about 70% by weight of non-coal tar bitumen;
          (b) from about 0.1% to about 3% by weight of an emulsifier which is the amine salt of an alkylbenzene sulfonic acid in which the alkyl contains from about 8 to about 16 carbon atoms and wherein the salt-forming amine is selected from amines having the formula:

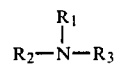

wherein $R_1$ is selected from the group consisting of aminoalkyl and monohydroxyalkyl radicals containing from 1 to about 6 carbon atoms and $R_2$ and $R_3$ are each selected from the group consisting of hydrogen, alkyl, aminoalkyl and monohydroxyalkyl radicals containing from 1 to about 6 carbon atoms and wherein the molar ratio of alkylbenzene sulfonic acid to amine in the amine salt is 1:1; and
          (c) from about 30% to about 50% water;
       (B) a particulate aggregate which is a siliceous or calcareous mineral having a particle size of from about 4 mesh to about 200 mesh;
    the said slurry containing from about 3 to about 150 parts of A. per 100 parts B.

* * * * *